United States Patent
Lin et al.

(10) Patent No.: US 10,711,936 B2
(45) Date of Patent: Jul. 14, 2020

(54) WEIGHT ASSEMBLY FOR A FAUCET

(71) Applicant: Globe Union Industrial Corp., Taichung (TW)

(72) Inventors: Yiping Lin, Taichung (TW); Kuotung Ni, Taichung (TW); Chungyi Huang, Taichung (TW)

(73) Assignee: Globe Union Industries Corp., Taichung (TW)

( * ) Notice: Subject to any disclaimer, the term of this patent is extended or adjusted under 35 U.S.C. 154(b) by 0 days.

(21) Appl. No.: 16/364,582

(22) Filed: Mar. 26, 2019

(65) Prior Publication Data

US 2019/0331278 A1 Oct. 31, 2019

(51) Int. Cl.
*F16L 55/00* (2006.01)
*E03C 1/18* (2006.01)
*E03C 1/04* (2006.01)

(52) U.S. Cl.
CPC .............. *F16L 55/00* (2013.01); *E03C 1/04* (2013.01); *E03C 1/18* (2013.01)

(58) Field of Classification Search
CPC ............... F16L 55/00; E03C 1/04; E03C 1/18
USPC ............... 4/678; 137/801; 138/103; 239/588
See application file for complete search history.

(56) References Cited

U.S. PATENT DOCUMENTS

| 5,771,934 | A | * | 6/1998 | Warshawsky | ......... E03C 1/0401 |
| | | | | | 4/678 |
| 6,250,338 | B1 | * | 6/2001 | Dempsey | ................... E03C 1/04 |
| | | | | | 4/678 |
| 6,460,570 | B1 | | 10/2002 | Jones et al. | |
| 2012/0042972 | A1 | * | 2/2012 | Liu | ........................... E03C 1/04 |
| | | | | | 137/801 |
| 2015/0113767 | A1 | * | 4/2015 | Yuan | ......................... E03C 1/04 |
| | | | | | 16/400 |

* cited by examiner

*Primary Examiner* — Tuan N Nguyen
(74) *Attorney, Agent, or Firm* — Alan D. Kamrath; Mayer & Williams PC

(57) ABSTRACT

A weight assembly is fixed on a hose of a faucet and contains: a tubular retainer and a counterweight. The tubular retainer includes a first segment, a second segment, a fitting orifice, an opening, an engagement portion, and a forced portion. The counterweight includes a third segment, a fourth segment, a through orifice, and a press portion. After the tubular retainer is fitted on the hose, the fourth segment of the counterweight moves toward the first segment of the tubular retainer so that the press portion presses the forced portion of the tubular retainer after the tubular retainer is accommodated into the through orifice, and the forced portion retracts inward to actuate the engagement portion to engage with the hose.

14 Claims, 21 Drawing Sheets

WEIGHT ASSEMBLY FOR A FAUCET

FIELD OF THE INVENTION

The present invention relates to a weight assembly for a faucet which is fixed on a hose easily, quickly, and securely.

BACKGROUND OF THE INVENTION

A conventional spray hose assembly includes a hose and a spray head, and one end of the hose is connected to a water supply source, and another end thereof is coupled to the spray head. In a normal state, the hose is fixed under a tank, and the spray head is positioned in a receiving seat of the tank so that when a user pulls the spray head, the hose extends outward from an opening of the receiving seat. Moreover, a weight assembly is installed on the hose so that the spray head returns back to the receiving seat when in no use by using the weight assembly's weight.

A conventional weight assembly is integrally made and formed in an oval shape, includes a hole to insert and retain a hose, however when the weight assembly is assembled, it has to be fitted from one end of the hose and then moved toward a suitable position along the hose, thus having an inconvenient assembly. For example, when two ends of the hose are connected, the weight assembly is not easy to be removed, and because a size of the hole is fixed, as the hole is in a small size, the weight assembly cannot be moved along the hose easily. Even though the weight assembly is capable of being moved along the hose, the hose is deformable and broken easily. While the hole is in a large size, the weight assembly cannot be fixed on the hose securely.

U.S. Pat. No. 6,460,570 B1 discloses a weight assembly including a body having a plane extending vertically, and including an open groove, a depth of which is more than a half of a diameter of a hose so as to receive the hose, and including a retaining member with inner screws to pass through the groove and to screw with outer screws of the plane of the body so that the weight assembly is fixed on the hose tightly.

However, before fixing or removing the retaining member, it has to be removed from the body or the hose. For example, after the body is fixed on the hose, it has to be screwed with the retaining member further, thus removing and screwing the retaining member repeatedly to cause an inconvenient assembly.

The weight assembly is screwed loosely and tightly by screwing or unscrewing the retaining member with the body so as to retain the hose. However, when the retaining member is screwed with the body forcefully, the hose is broken easily. In addition, the body is actuated when the hose is pulled, so it is easy to be removal.

The present invention has arisen to mitigate and/or obviate the afore-described disadvantages.

SUMMARY OF THE INVENTION

One aspect of the present invention is to provide a weight assembly for a faucet which is fixed on a hose easily, quickly, and securely.

Another aspect of the present invention is to provide a weight assembly for a faucet which does not damage the hose and rotates the screw nut easily.

To obtain the above, a weight assembly for a faucet provided by the present invention contains: a tubular retainer and a counterweight.

The tubular retainer includes a first segment, a second segment, a fitting orifice defined between the first segment and the second segment, an opening formed on a side of the fitting orifice and communicating with the fitting orifice so that the hose is fitted with the fitting orifice via the opening, an engagement portion arranged on an inner wall of the fitting orifice relative to the second segment so as to engage with the hose and to avoid a movement of the hose in the fitting orifice, and a forced portion formed on an outer wall of the tubular retainer relative to the second segment.

The counterweight includes a third segment, a fourth segment, a through orifice defined between the third segment and the fourth segment so that the counterweight is fitted onto the hose by way of the through orifice, and a press portion formed on an inner wall of the through orifice relative to the fourth segment, such that after the tubular retainer is fitted on the hose, the fourth segment of the counterweight moves toward the first segment of the tubular retainer so that the press portion presses the forced portion of the tubular retainer after the tubular retainer is accommodated into the through orifice, and the forced portion retracts inward to actuate the engagement portion to engage with the hose.

Preferably, the tubular retainer includes two positioning extensions extending from two sides of the opening respectively, wherein a channel is defined between the two positioning extensions so that the hose s fitted into the fitting orifice via the channel and the opening; the through orifice of the counterweight includes a fixing notch defined on the inner wall of the through orifice and extending from the third segment to the fourth segment so that the two positioning extensions are engaged into the fixing notch from the fourth segment of the counterweight to the third segment of the counterweight, and the tubular retainer is limited to rotate relative to the counterweight.

Preferably, the two positioning extensions have two first tilted guide faces formed on two tops of the two positioning extensions respectively opposite to the fixing notch, the fixing notch has two second tilted guide faces arranged on two opposite sides of a bottom of the fixing notch individually opposite to the two positioning extensions, and the two first tilted guide faces of the two positioning extensions are respectively guided by the two second tilted guide faces to slide into the fixing notch.

Preferably, the engagement portion of the tubular retainer has multiple locking teeth.

Preferably, the engagement portion of the tubular retainer has two meshing sets, and each of the two meshing sets has the multiple locking teeth extending around each meshing set, wherein the two meshing sets circumferentially extend from the two sides of the opening respectively, and the engagement portion has a partition opposite to the opening.

Preferably, the forced portion of the tubular retainer has an externally conical face formed thereon, and the press portion of the counterweight has an internally conical face for contacting with the externally conical face so as to force the forced portion to flexibly retract inward.

Preferably, a circular groove is defined among the externally conical face and the two meshing sets so that the forced portion is formed in a trumpet shape to flexibly retract inward, and the forced portion is connected with an outer surface of a bottom of the second segment opposite to each of the two positioning extensions, such that when the forced portion is pressed to actuate the two positioning extensions to move closes to each other, the two positioning extensions drive the two meshing sets to engage with the hose tightly.

Preferably, the counterweight includes an internal sleeve and an external sleeve fully or partially covering the internal sleeve, wherein the internal sleeve is made of metal, and the external sleeve is made of rubber.

Preferably, the through orifice of the counterweight has a connection trench opposite to the third segment, a diameter of the connection trench is more than the through orifice so that the connection trench is fitted on a screw nut above the hose before connecting the counterweight with the tubular retainer, and the screw nut is rotated loosely and tightly by rotating the counterweight.

Preferably, the connection trench has an inner wall formed in a polygon shape so that the connection trench is fitted with a polygonal rim of the screw nut and rotates the screw nut.

Preferably, the through orifice of the counterweight has two connection trenches formed on two ends of the through orifice respectively, wherein a diameter of each of the two connection trenches is more than the through orifice.

Preferably, each of the two connection trenches has an inner wall formed in a polygon shape so that each connection trench is fitted with a polygonal rim of the screw nut and rotates the screw nut.

Preferably, the counterweight includes an anti-slip structure configured to be grasped by a user.

Preferably, the anti-slip structure has a plurality of peripheral faces surrounding around an outer wall of the anti-slip structure and spaced apart from one another of the plurality of peripheral faces.

DETAILED DESCRIPTION OF THE PREFERRED EMBODIMENTS

Figure 1:
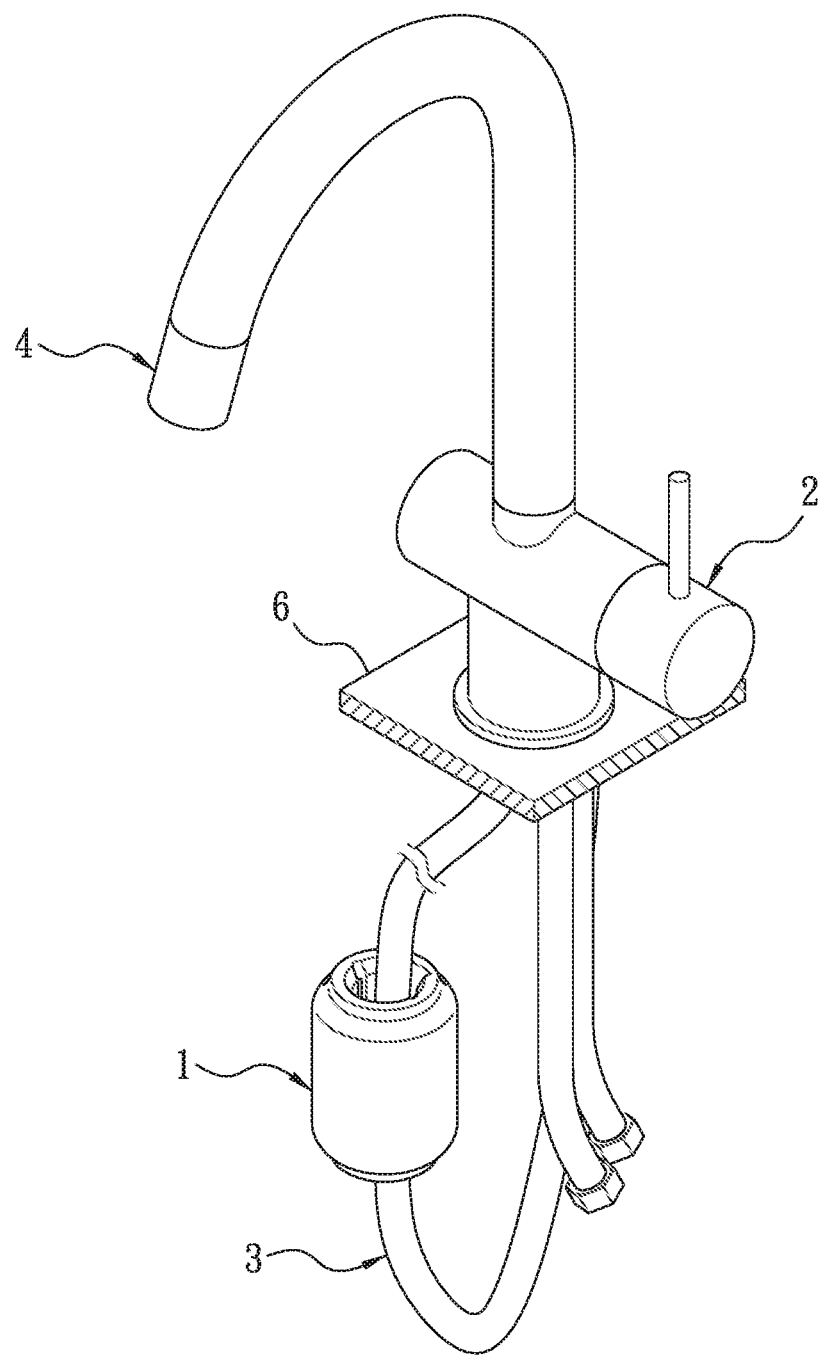
FIG. 1 is a perspective view showing a weight assembly for a faucet being fixed on a hose of the faucet according to a first embodiment of the present invention.
Figure 2:
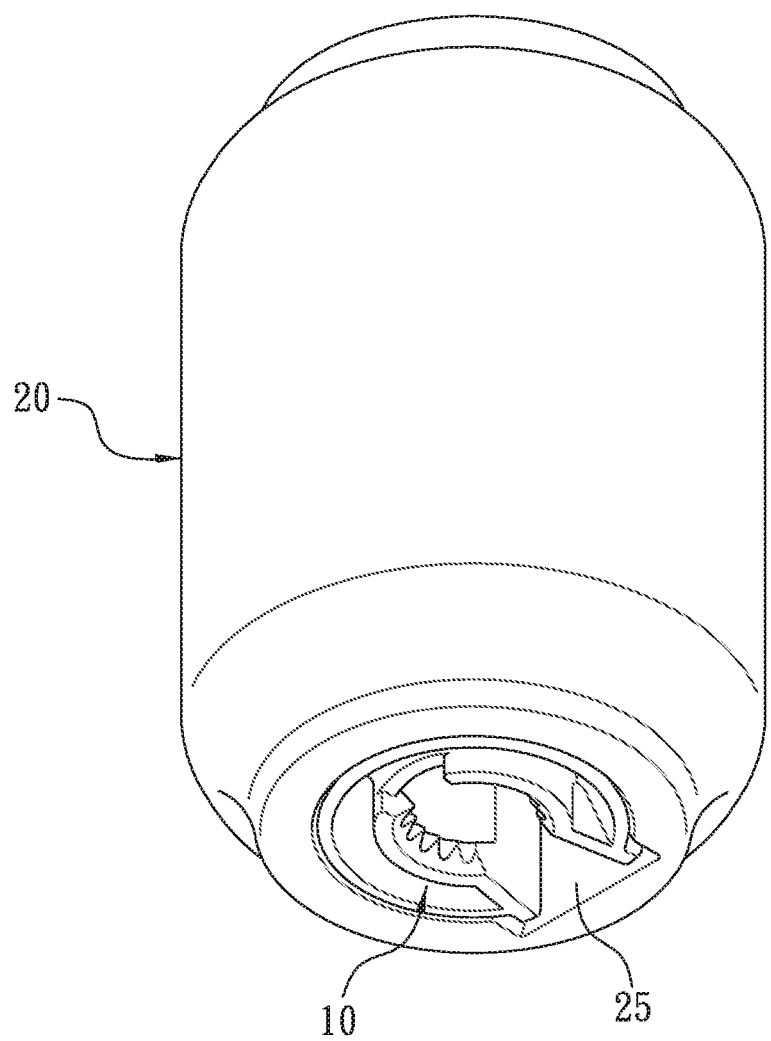
FIG. 2 is a perspective view showing the assembly of the weight assembly for the faucet according to the first embodiment of the present invention.

With reference to FIGS. 1-13, a weight assembly 1 for a faucet according to a first embodiment of the present invention is fixed on a hose 3 of a faucet 2, and the hose 3 is connected with a movable spray head 4 so that water sprays out of the spray head 4 via the hose 3.

Referring to FIGS. 2-6, the weight assembly 1 includes a tubular retainer 10 and a counterweight 20.

Figure 7:
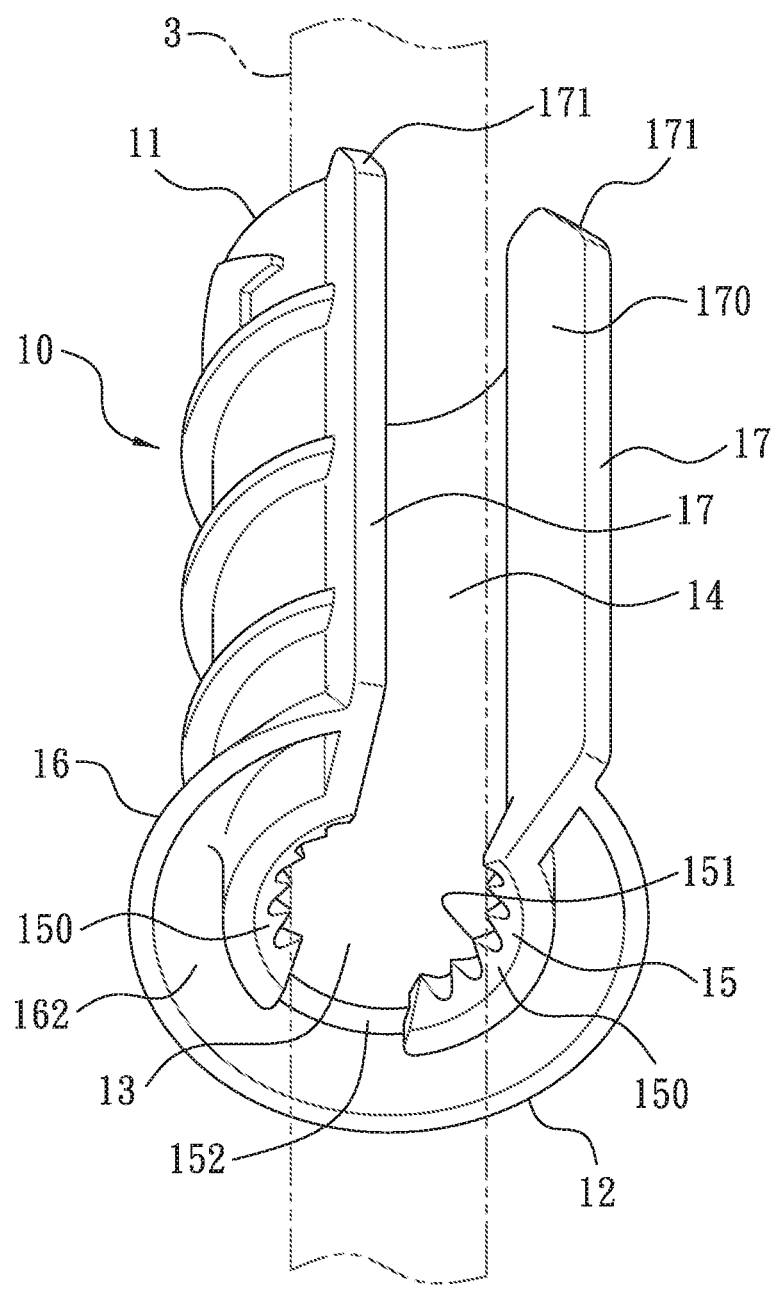
FIG. 7 is a perspective view showing the assembly of a part of the weight assembly for the faucet according to the first embodiment of the present invention, wherein a hose is indicated by an imaginary line.
Figure 8:
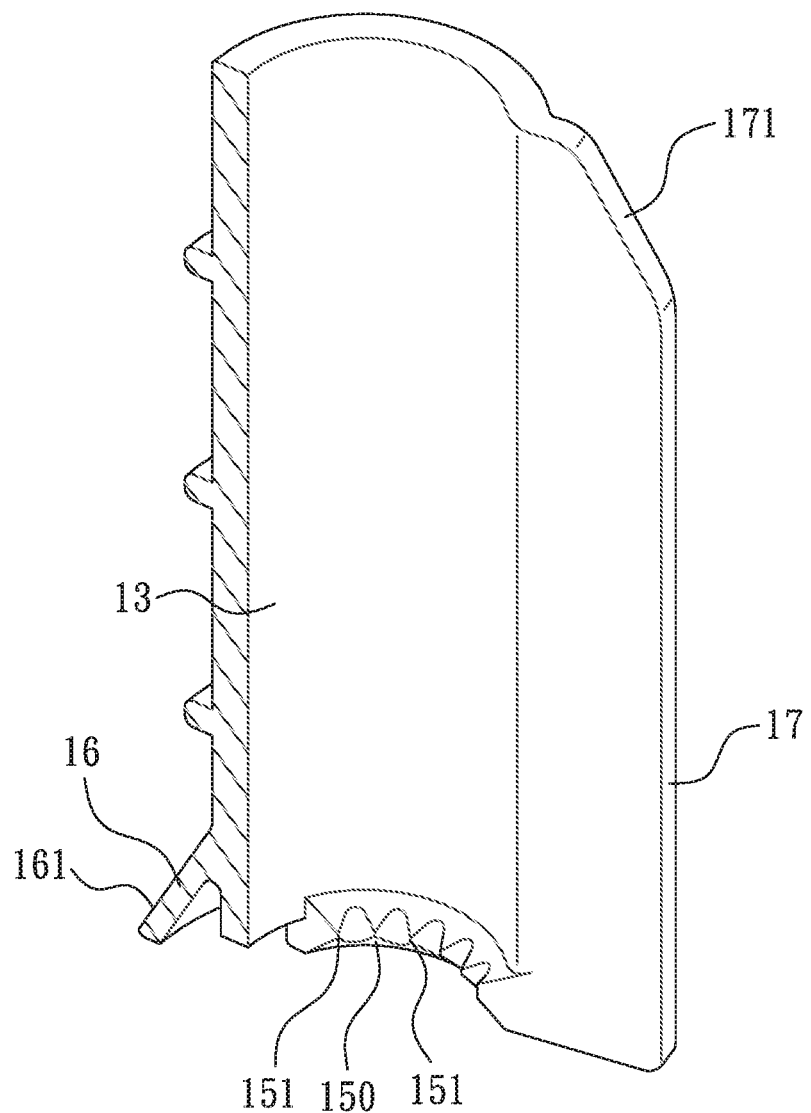
FIG. 8 is a cross-sectional perspective view showing the assembly of a part of the counterweight of the assembly of the weight assembly for the faucet according to the first embodiment of the present invention.

As shown in FIGS. 7 and 8, the tubular retainer 10 includes a first segment 11, a second segment 12, a fitting orifice 13 defined between the first segment 11 and the second segment 12, an opening 14 formed on a side of the fitting orifice 13 and communicating with the fitting orifice 13 so that the hose 3 is fitted with the fitting orifice 13 via the opening 14, an engagement portion 15 arranged on an inner wall of the fitting orifice 13 relative to the second segment 12 so as to engage with the hose 3 and to avoid a movement of the hose 3 in the fitting orifice 13, and a forced portion 16 formed on an outer wall of the tubular retainer 10 relative to the second segment 12.

Figure 9:
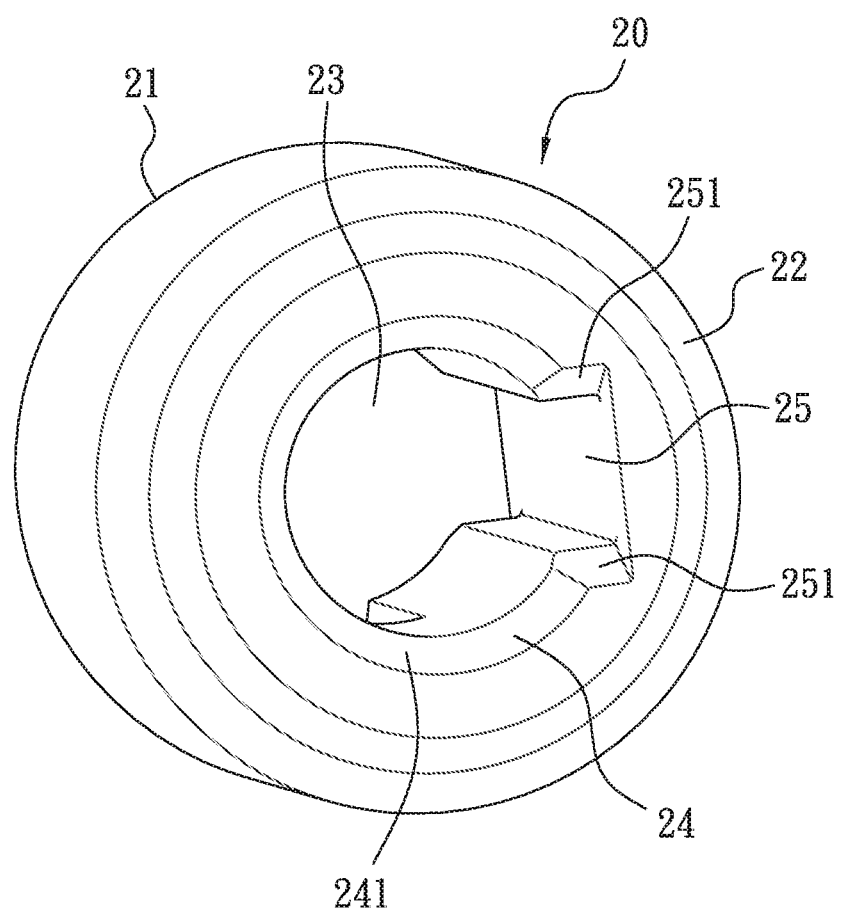
FIG. 9 is a perspective view showing the assembly of a part of the counterweight of the weight assembly for the faucet according to the first embodiment of the present invention.
Figure 10:
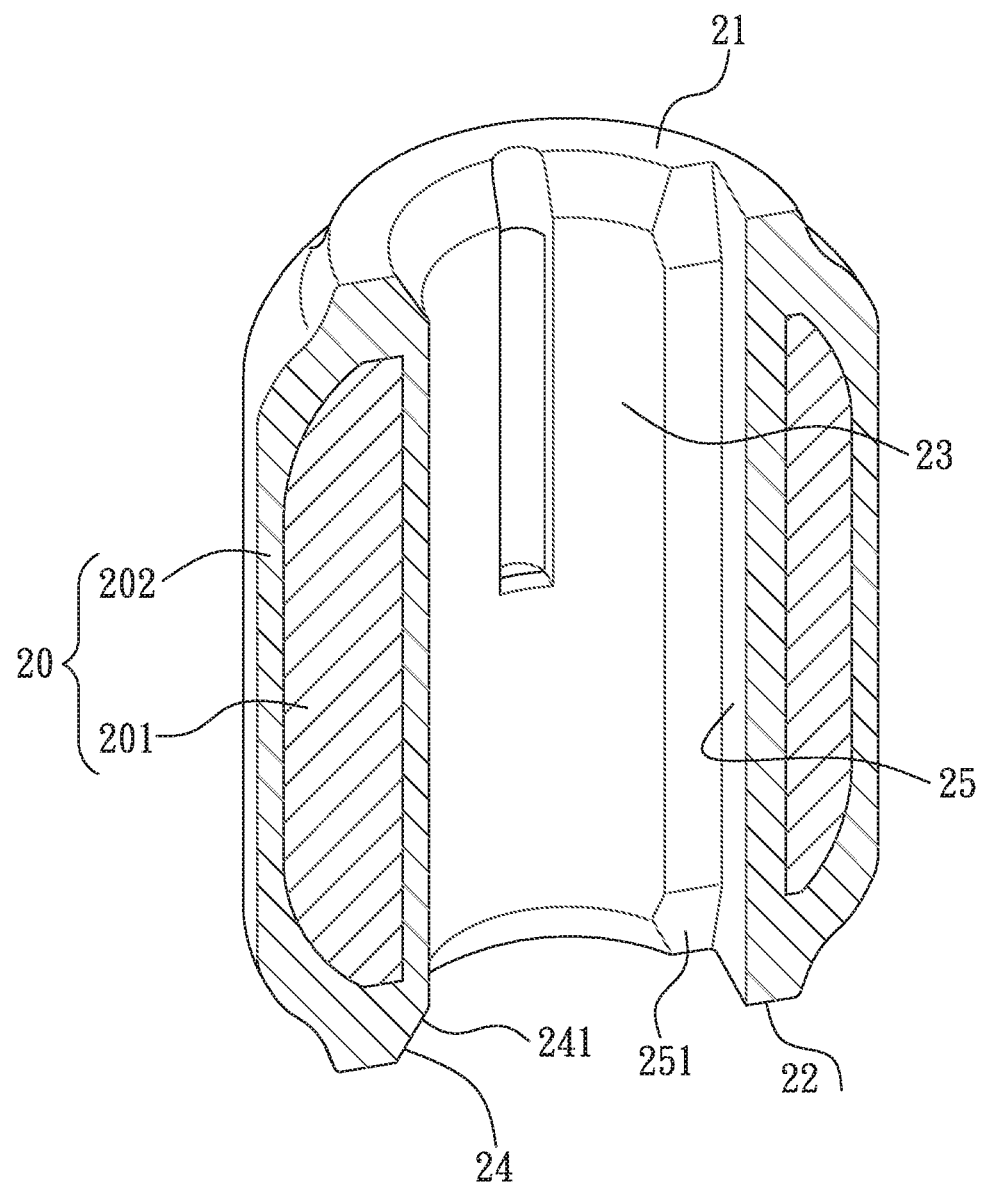
FIG. 10 is a cross-sectional perspective view showing the assembly of a part of the weight assembly for the faucet according to the first embodiment of the present invention.
Figure 11:
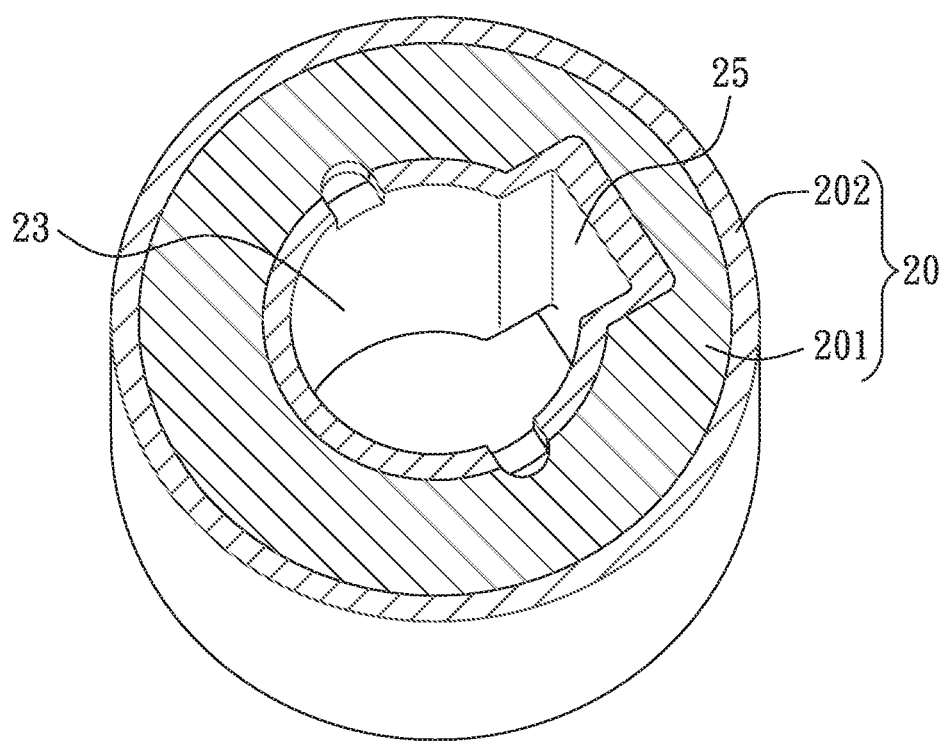
FIG. 11 is a cross-sectional view showing the assembly of a part of the weight assembly for the faucet according to the first embodiment of the present invention.
Figure 12:
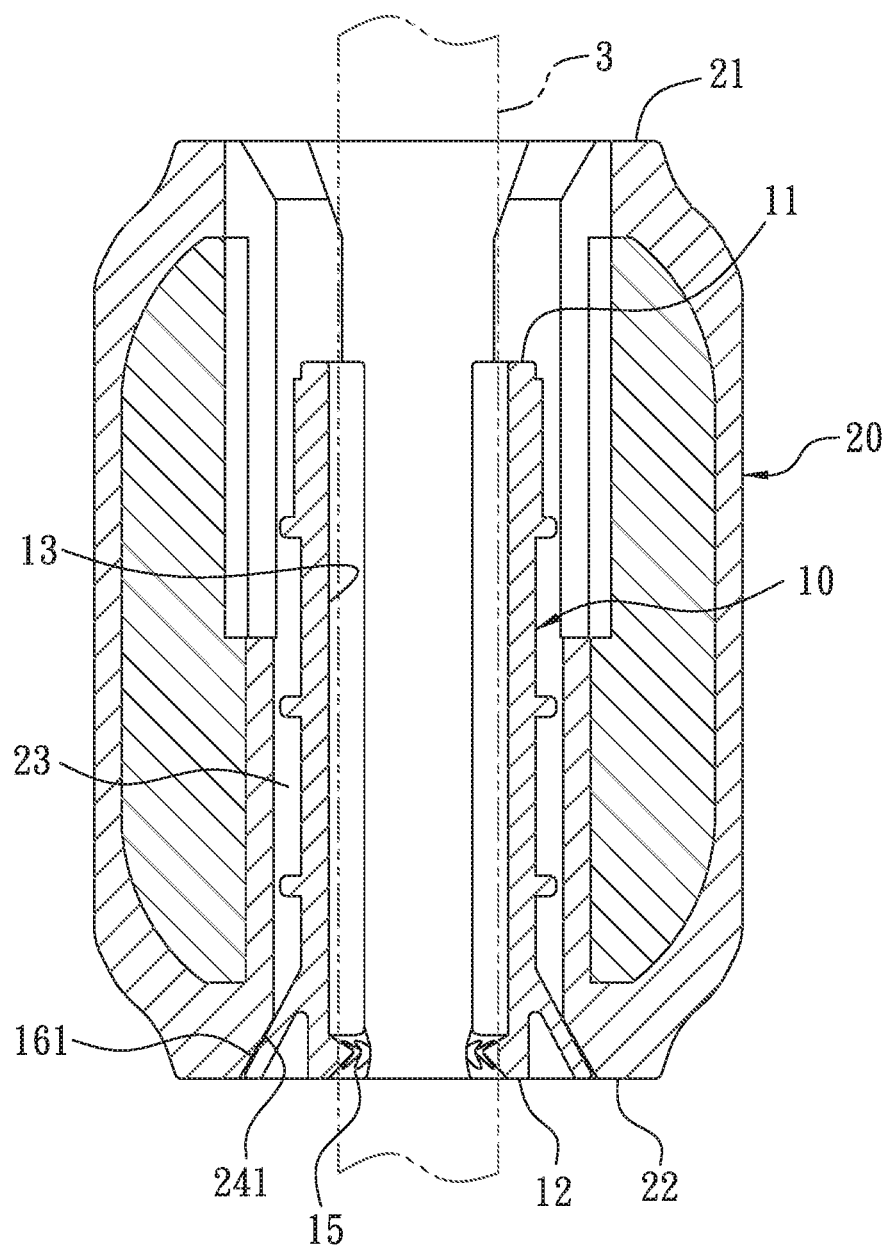
FIG. 12 is a cross sectional view showing the operation of the weight assembly for the faucet according to the first embodiment of the present invention.
Figure 13:
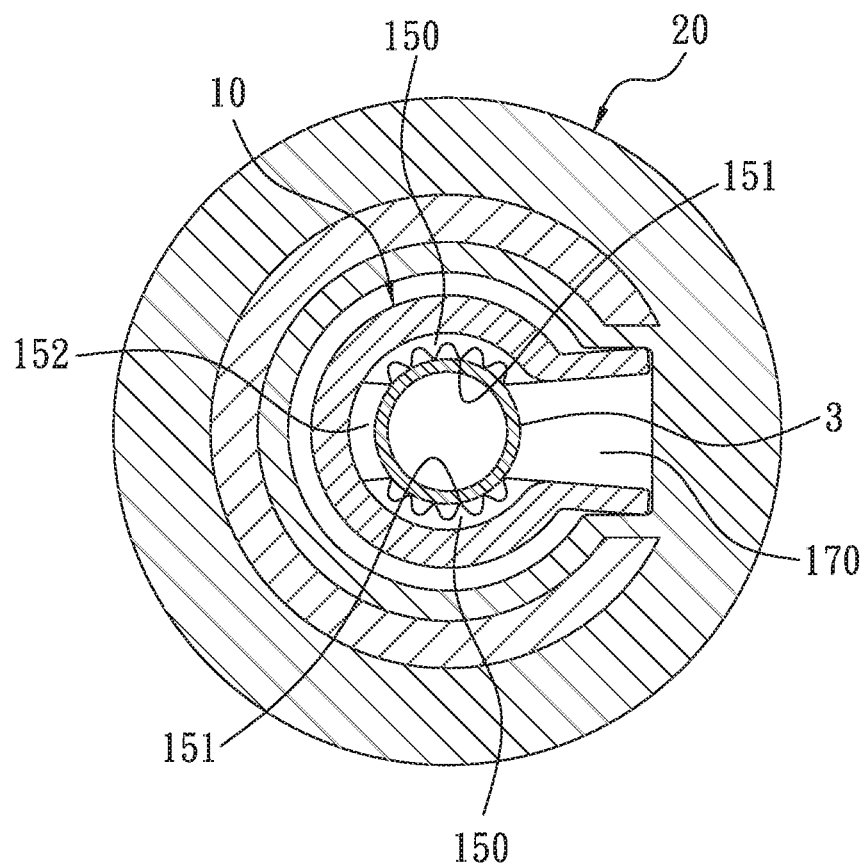
FIG. 13 is another cross sectional view showing the operation of the weight assembly for the faucet according to the first embodiment of the present invention.
Figure 14:
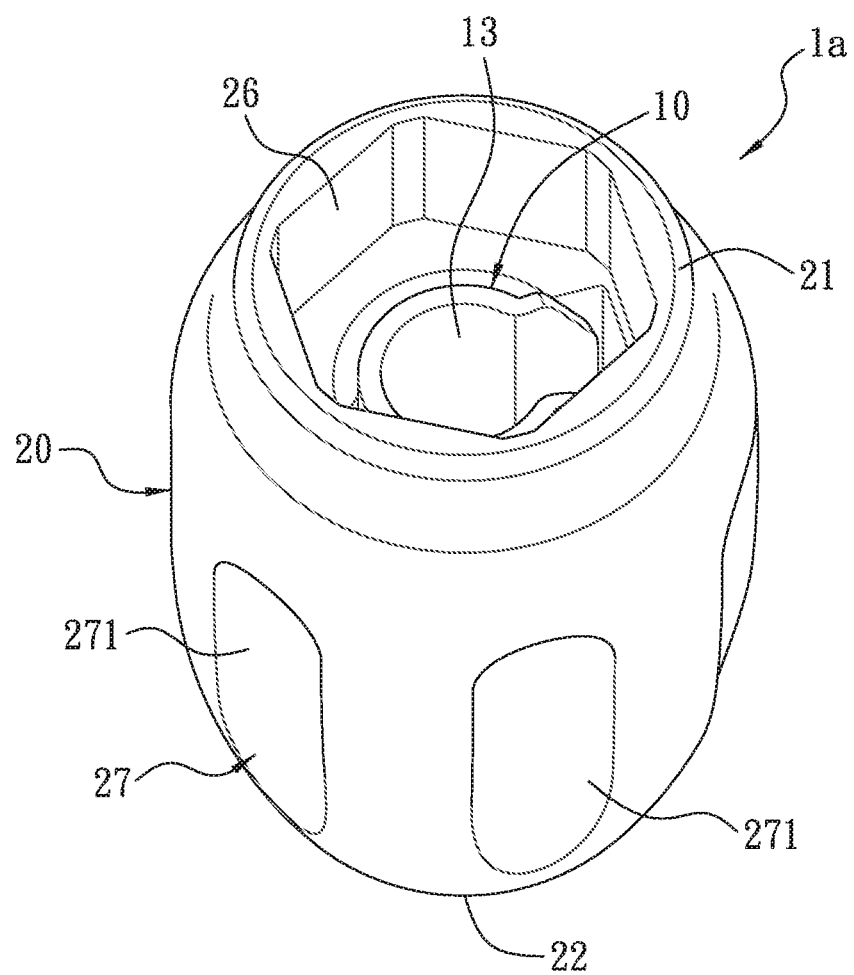
FIG. 14 is a perspective view showing the assembly of a weight assembly for a faucet according to a second embodiment of the present invention.
Figure 15:
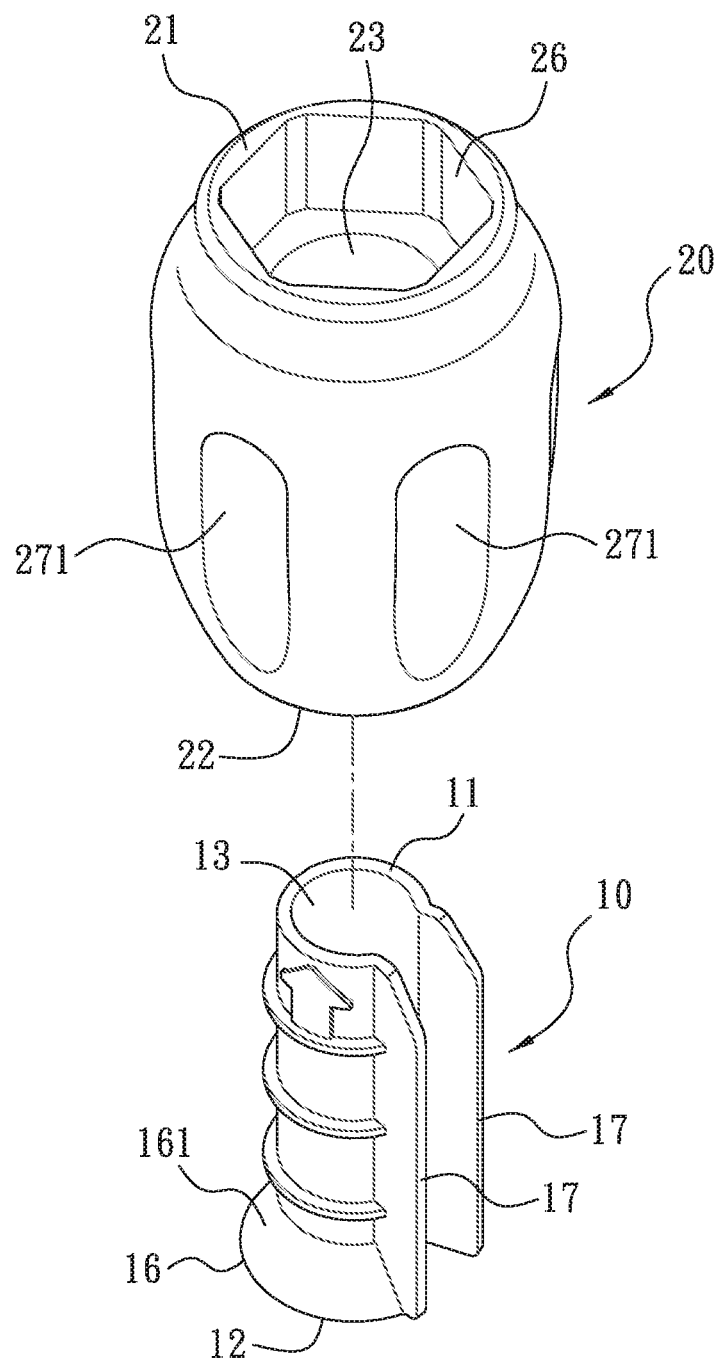
FIG. 15 is a perspective view showing the exploded components of the weight assembly for the faucet according to the second embodiment of the present invention.
Figure 16:
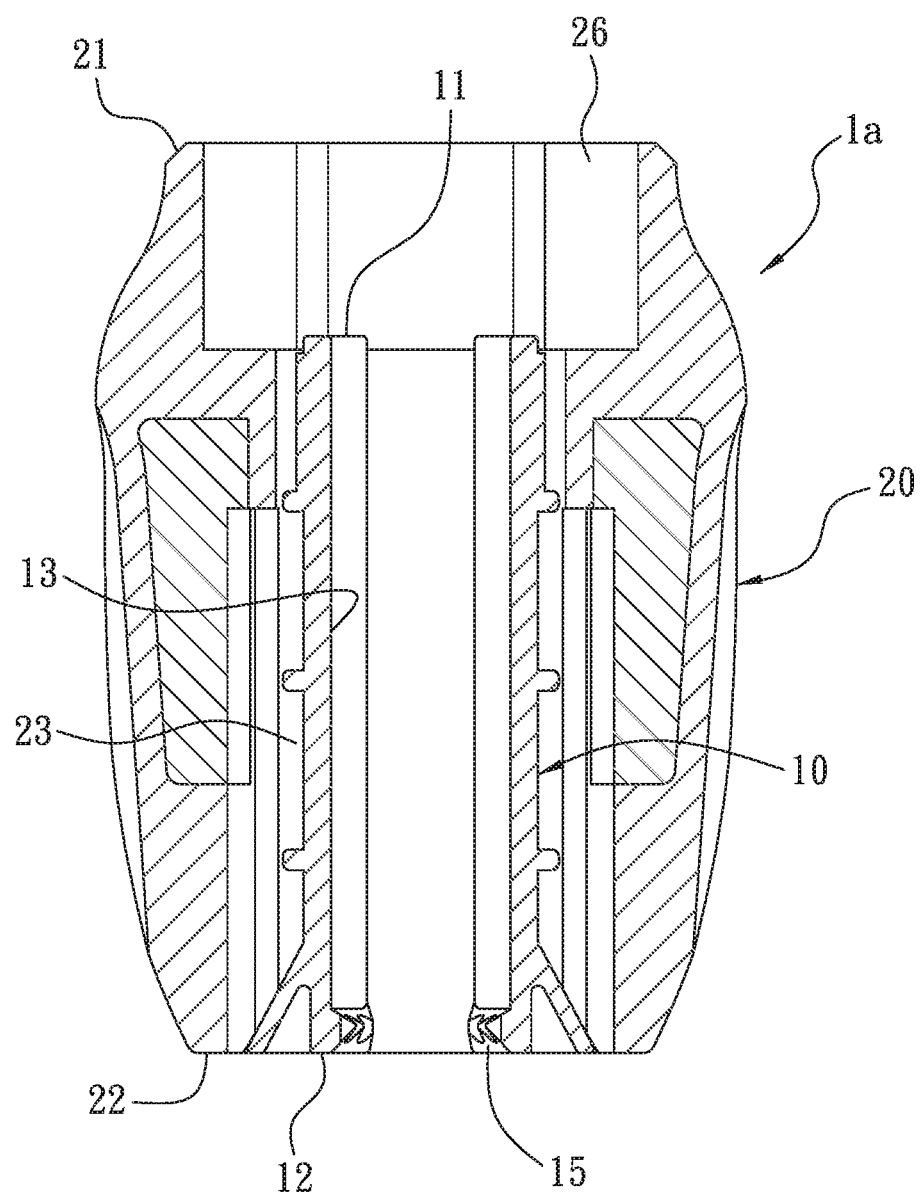
FIG. 16 is a cross sectional view showing the assembly of the weight assembly for the faucet according to the second embodiment of the present invention.
Figure 17:
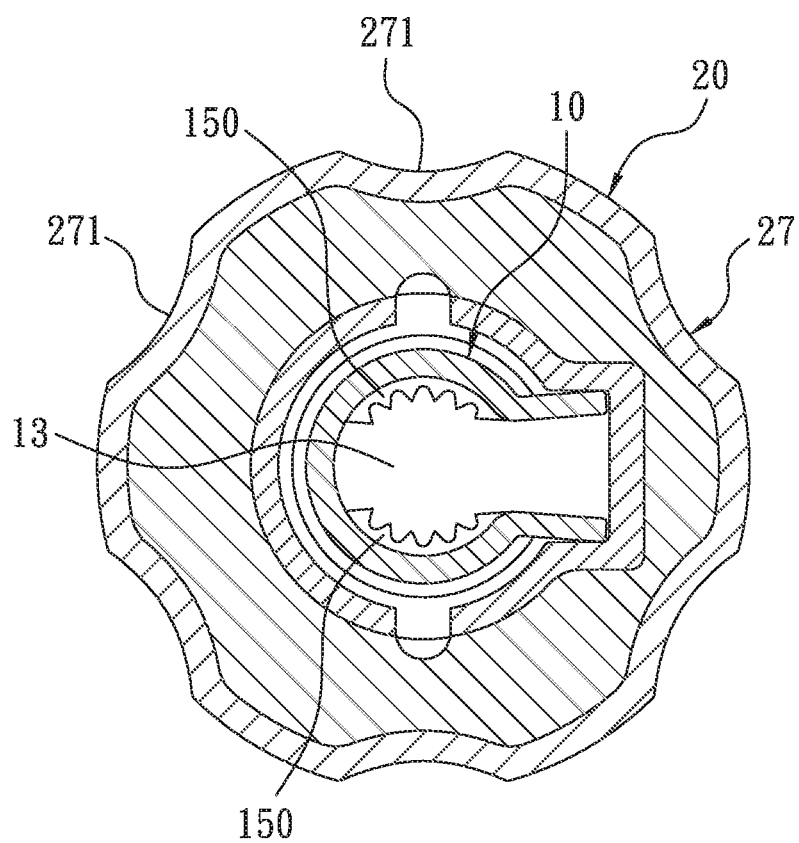
FIG. 17 is another cross sectional view showing the assembly of the weight assembly for the faucet according to the second embodiment of the present invention.
Figure 18:
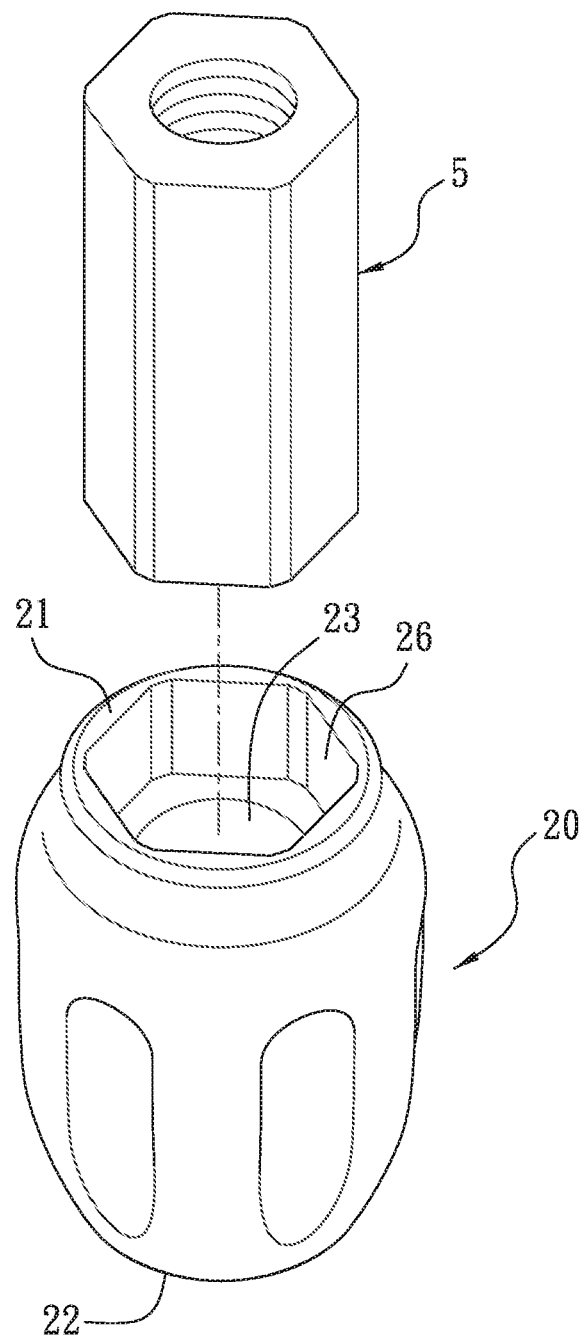
FIG. 18 is a perspective view showing the operation of the weight assembly for the faucet according to the second embodiment of the present invention.

As illustrated in FIGS. 9-11, the counterweight 20 includes a third segment 21, a fourth segment 22, a through orifice 23 defined between the third segment 21 and the fourth segment 22 so that the counterweight 20 is fitted onto the hose 3 by way of the through orifice 23, and a press portion 24 formed on an inner wall of the through orifice 23 relative to the fourth segment 22, such that after the tubular retainer 10 is fitted on the hose 3, the fourth segment 22 of the counterweight 20 moves toward the first segment 11 of the tubular retainer 10 so that the press portion 24 presses the forced portion 16 of the tubular retainer 10 after the tubular retainer 10 is accommodated into the through orifice 23, and the forced portion 16 retracts inward to actuate the engagement portion 15 to engage with the hose 3.

With reference to FIGS. 9-11, the tubular retainer 10 includes two positioning extensions 17 extending from two sides of the opening 14 respectively, wherein a channel 170 is defined between the two positioning extensions 17 so that the hose 3 is fitted into the fitting orifice 13 via the channel 170 and the opening 14. The through orifice 23 of the counterweight 20 includes a fixing notch 25 defined on the inner wall of the through orifice 23 and extending from the third segment 21 to the fourth segment 22 so that the two positioning extensions 17 are engaged into the fixing notch 25 from the fourth segment 22 of the counterweight 20 to the third segment 21 of the counterweight 20, and the tubular retainer 10 is limited to rotate relative to the counterweight 20.

With reference to FIGS. 7 and 8, the engagement portion 15 of the tubular retainer 10 has two meshing sets 150, and each of the two meshing sets 150 has multiple locking teeth 151 extending around each meshing set 150, wherein the two meshing sets 150 circumferentially extend from the two sides of the opening 14 respectively, and the engagement portion 15 has a partition 152 opposite to the opening 14.

The forced portion 16 of the tubular retainer 10 has an externally conical face 161 formed thereon, and the press portion 24 of the counterweight 20 has an internally conical face 241 for contacting with the externally conical face 161 so as to force the forced portion 16 to flexibly retract inward.

Referring to FIG. 7, a circular groove 162 is defined among the externally conical face 161 and the two meshing sets 150 so that the forced portion 16 is formed in a trumpet shape to flexibly retract inward. The forced portion 16 is connected with an outer surface of a bottom of the second segment 12 opposite to each of the two positioning extensions 17, such that when the forced portion 16 is pressed to actuate the two positioning extensions 17 to move closes to each other, the two positioning extensions 17 drive the two meshing sets 150 to engage with the hose 3 tightly.

Figure 3:
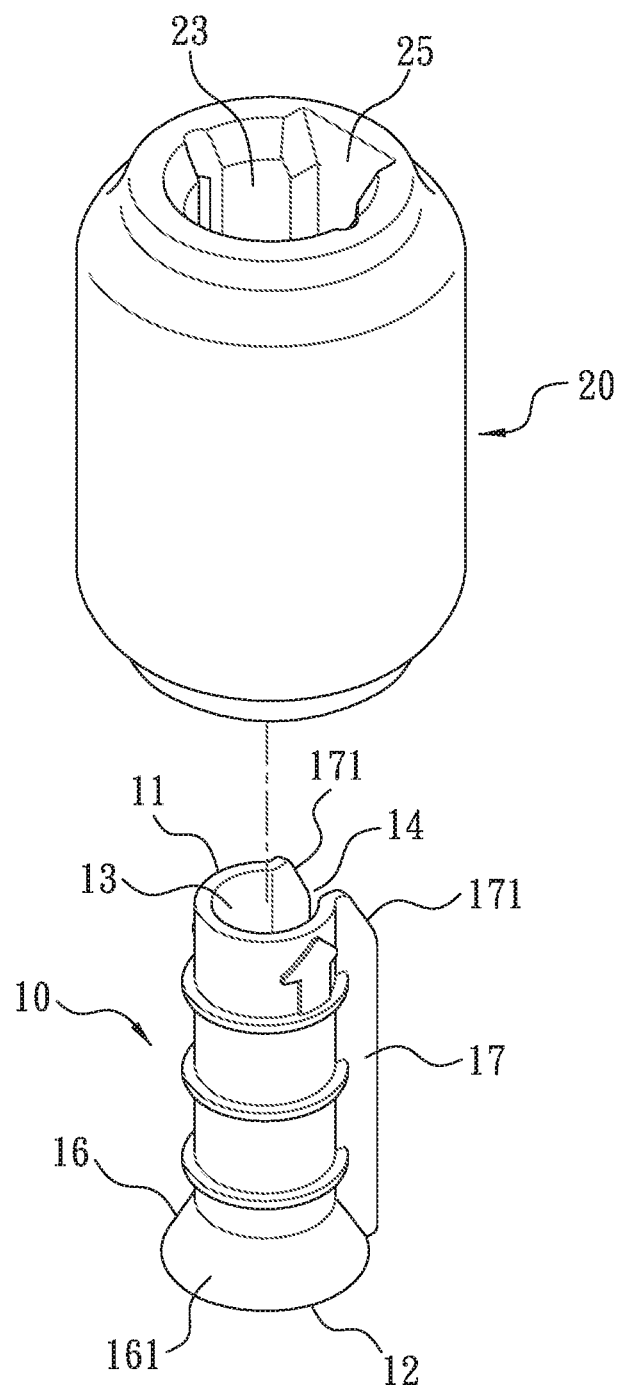
FIG. 3 is a perspective view showing the exploded components of the weight assembly for the faucet according to the first embodiment of the present invention.
Figure 4:
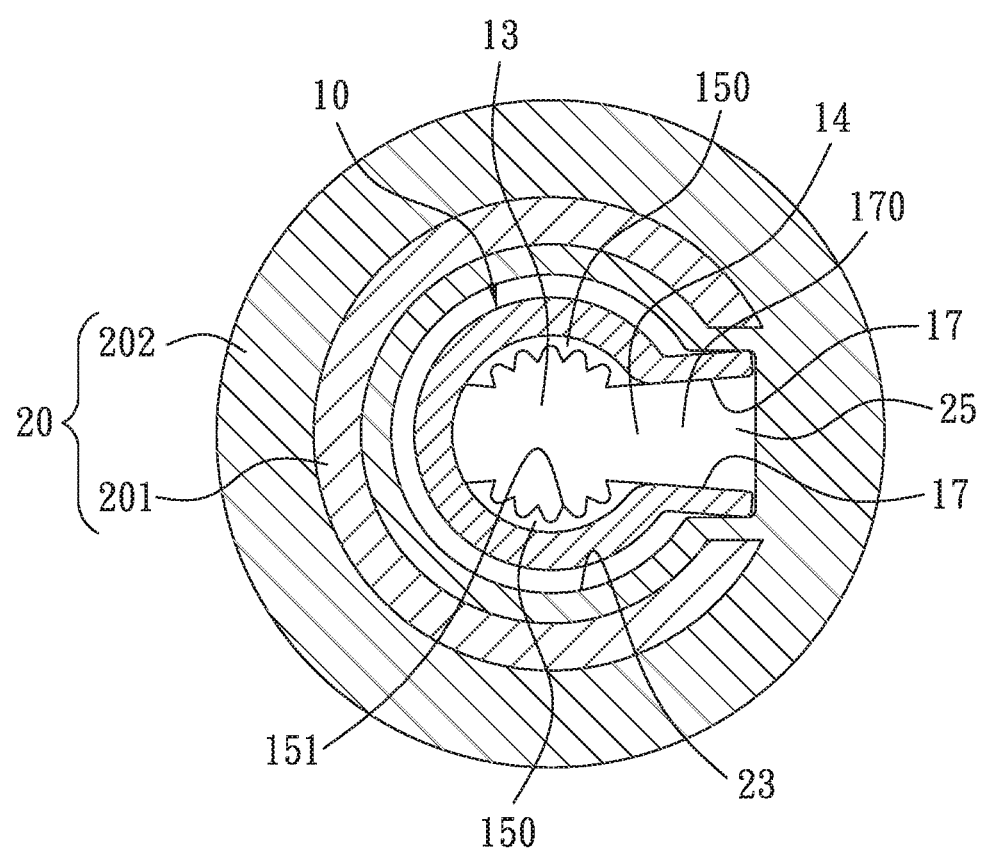
FIG. 4 is a cross sectional view showing the assembly of the weight assembly for the faucet according to the first embodiment of the present invention.
Figure 5:
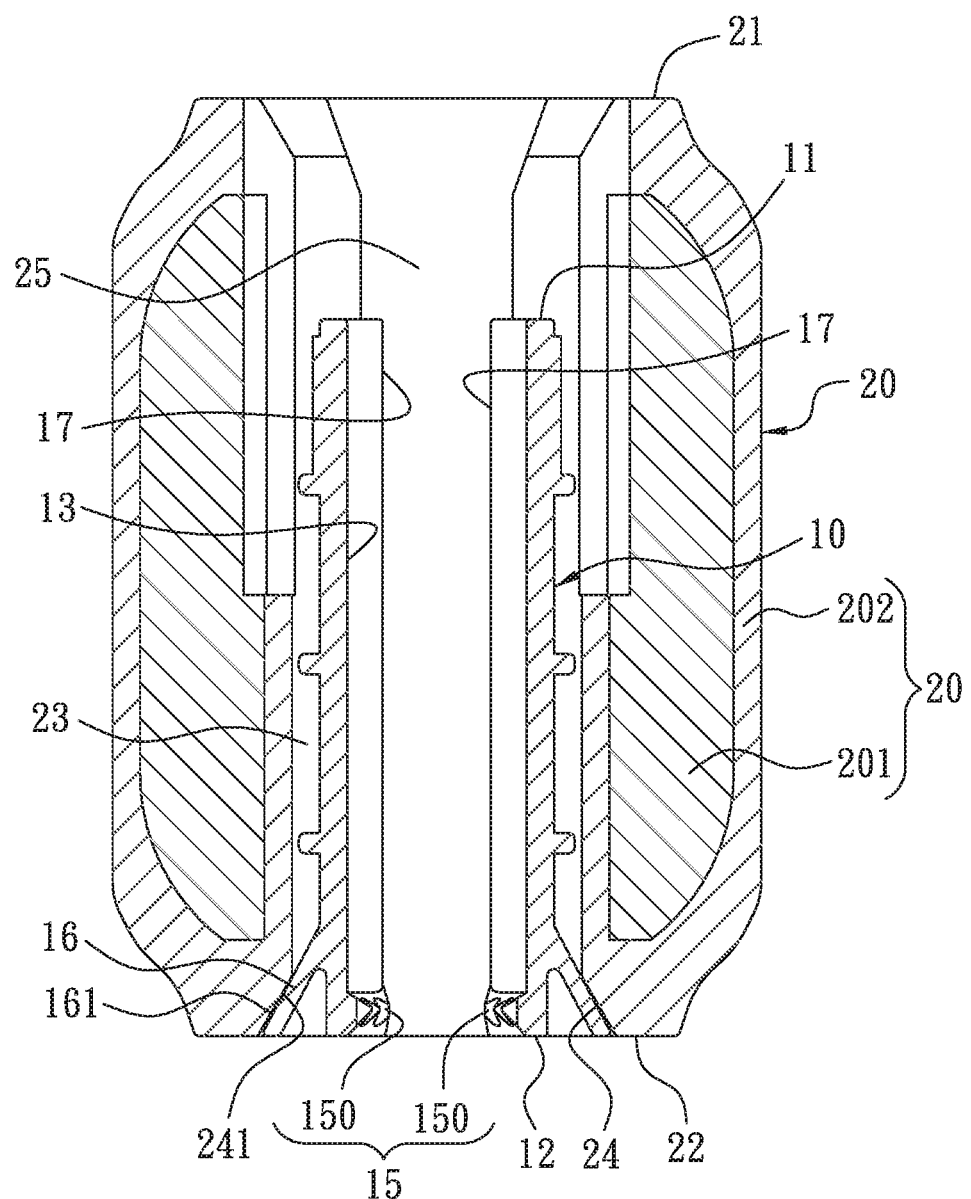
FIG. 5 is another cross sectional view showing the assembly of the weight assembly for the faucet according to the first embodiment of the present invention.
Figure 6:
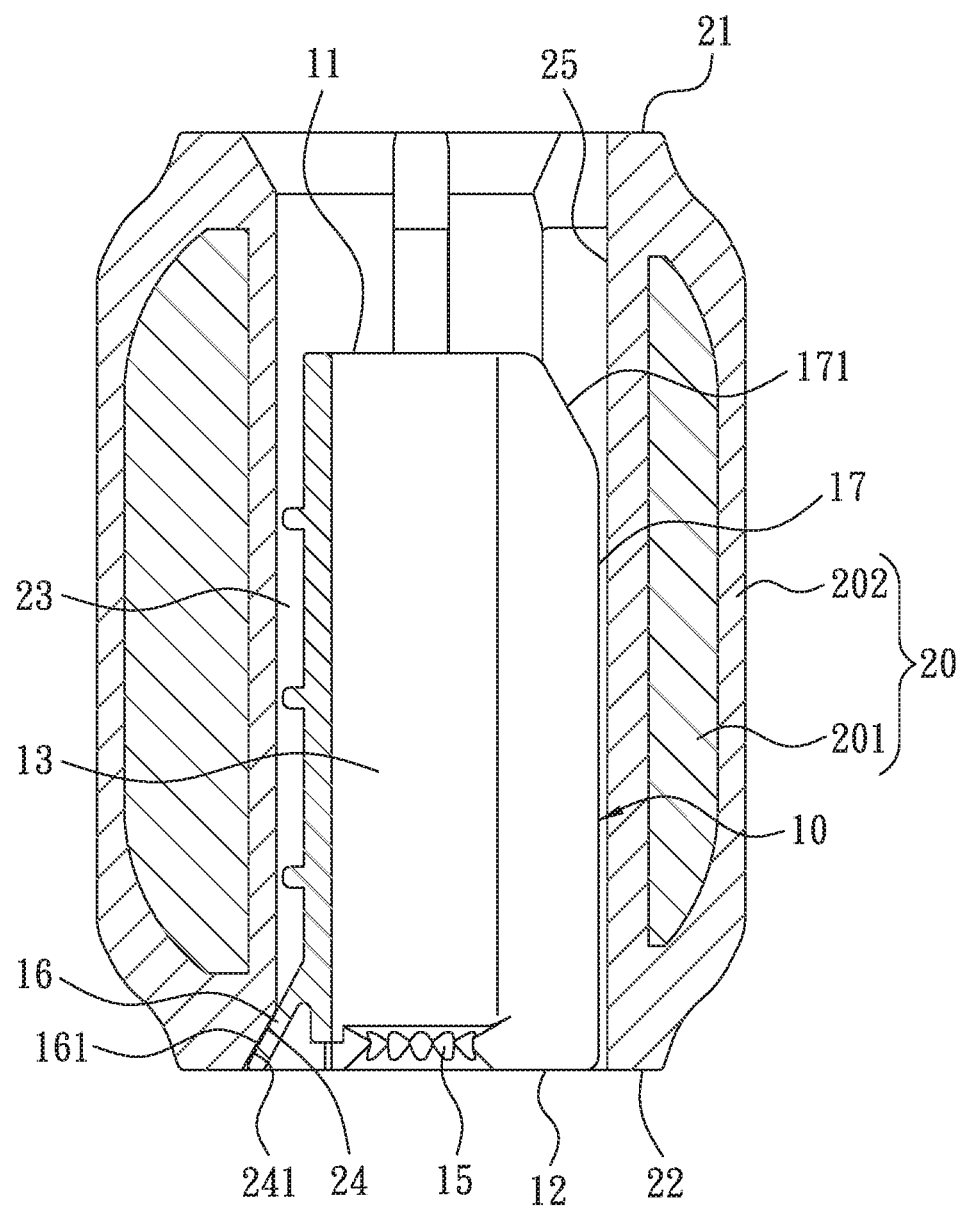
FIG. 6 is also another cross sectional view showing the assembly of the weight assembly for the faucet according to the first embodiment of the present invention.

As shown in FIGS. 3 and 7, the two positioning extensions 17 have two first tilted guide faces 171 formed on two tops of the two positioning extensions 17 respectively opposite to the fixing notch 25, and the fixing notch 25 has two second tilted guide faces 251 arranged on two opposite sides of a bottom of the fixing notch 25 individually opposite to the two positioning extensions 17. As illustrated in FIG. 9, the two first tilted guide faces 171 of the two positioning extensions 17 are respectively guided by the two second tilted guide faces 251 to slide into the fixing notch 25. In this embodiment, when the two positioning extensions 17 are respectively guided to slide into the fixing notch 25, they move close to each other so that the fitting orifice 13 of the tubular retainer 10 and the engagement portion 15 of the second segment 12 retract inward, and the tubular retainer 10 engages with the counterweight 20 securely.

As shown in FIGS. 10 and 11, the counterweight 20 includes an internal sleeve 201 and an external sleeve 202 fully or partially covering the internal sleeve 201, wherein the internal sleeve 201 is made of metal, and the external sleeve 202 is made of rubber.

With reference to FIGS. 14-18, a difference of a weight assembly 1 of a second embodiment from that of the first embodiment comprises:

the through orifice 23 of the counterweight 20 having a connection trench 26 opposite to the third segment 21, a diameter of the connection trench 26 is more than the through orifice 23 so that the connection trench 26 is fitted on a screw nut 5 above the hose 3 before connecting the counterweight 20 with the tubular retainer 10, and the screw nut 5 is rotated loosely and tightly by rotating the counterweight 20. For example, the screw nut 5 is configured to screw a cold-water inlet pipe, a hot-water inlet pipe or a mix-water outlet pipe on a faucet basin 6. Referring to FIG. 1, when the faucet 2 is mounted on the faucet basin 6, the cold-water inlet pipe, the hot-water inlet pipe, and the mix-water outlet pipe are inserted out of the faucet basin 6 downward from a defining orifice of the faucet basin 6, and the connection trench 26 of the counterweight 20 is rotatably fitted with the screw nut 5 without using any tools. Furthermore, the counterweight 20 is rotated to remove the screw nut 5.

The connection trench 26 has an inner wall formed in a polygon shape so that the connection trench 26 is fitted with a polygonal rim of the screw nut 5 and rotates the screw nut 5.

The counterweight 20 includes an anti-slip structure 27 configured to be grasped by a user. For example, the anti-slip structure 27 has a plurality of peripheral faces 271 surrounding around an outer wall of the anti-slip structure 27 and spaced apart from one another of the plurality of peripheral faces 271 so that the user grasps the counterweight 20 securely by using the plurality of peripheral faces 271.

Figure 19:
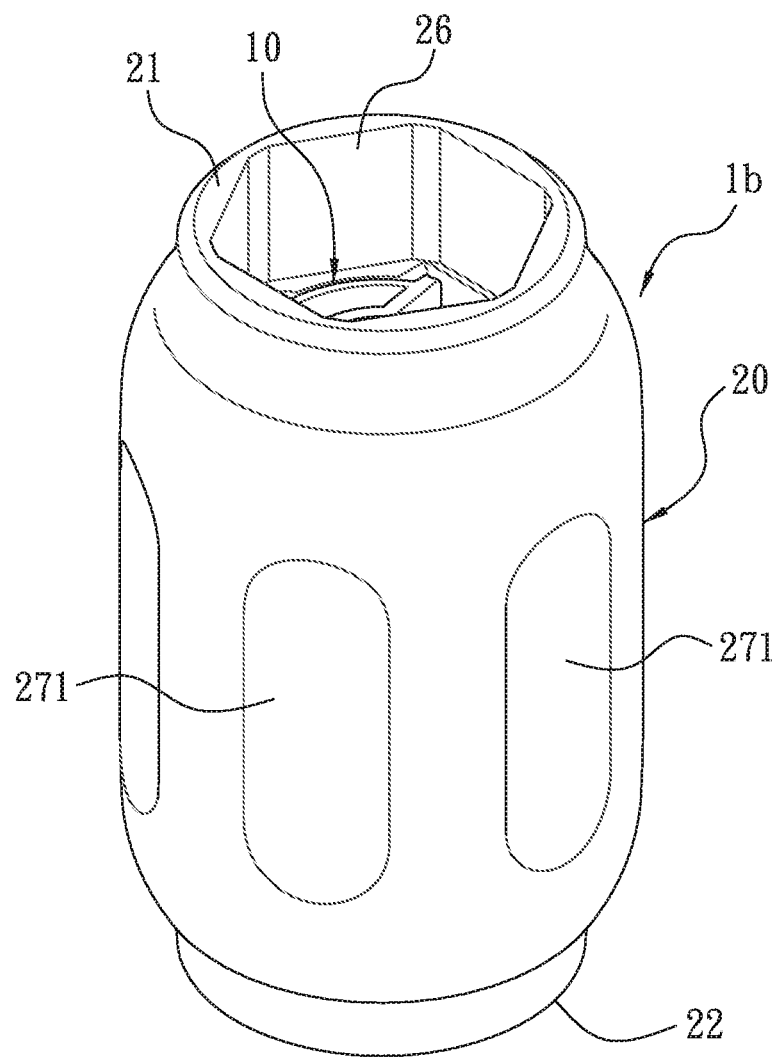
FIG. 19 is a perspective view showing the assembly of a weight assembly for a faucet according to a third embodiment of the present invention.
Figure 20:
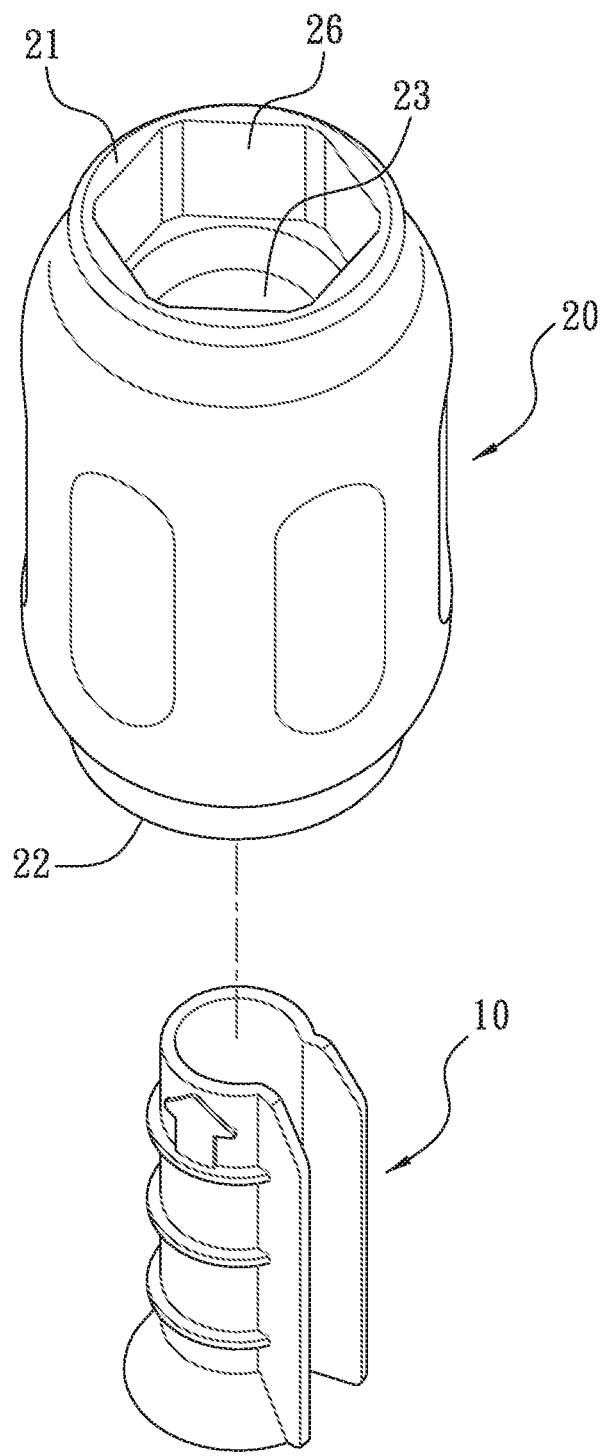
FIG. 20 is a perspective view showing the exploded components of the weight assembly for the faucet according to the third embodiment of the present invention.
Figure 21:
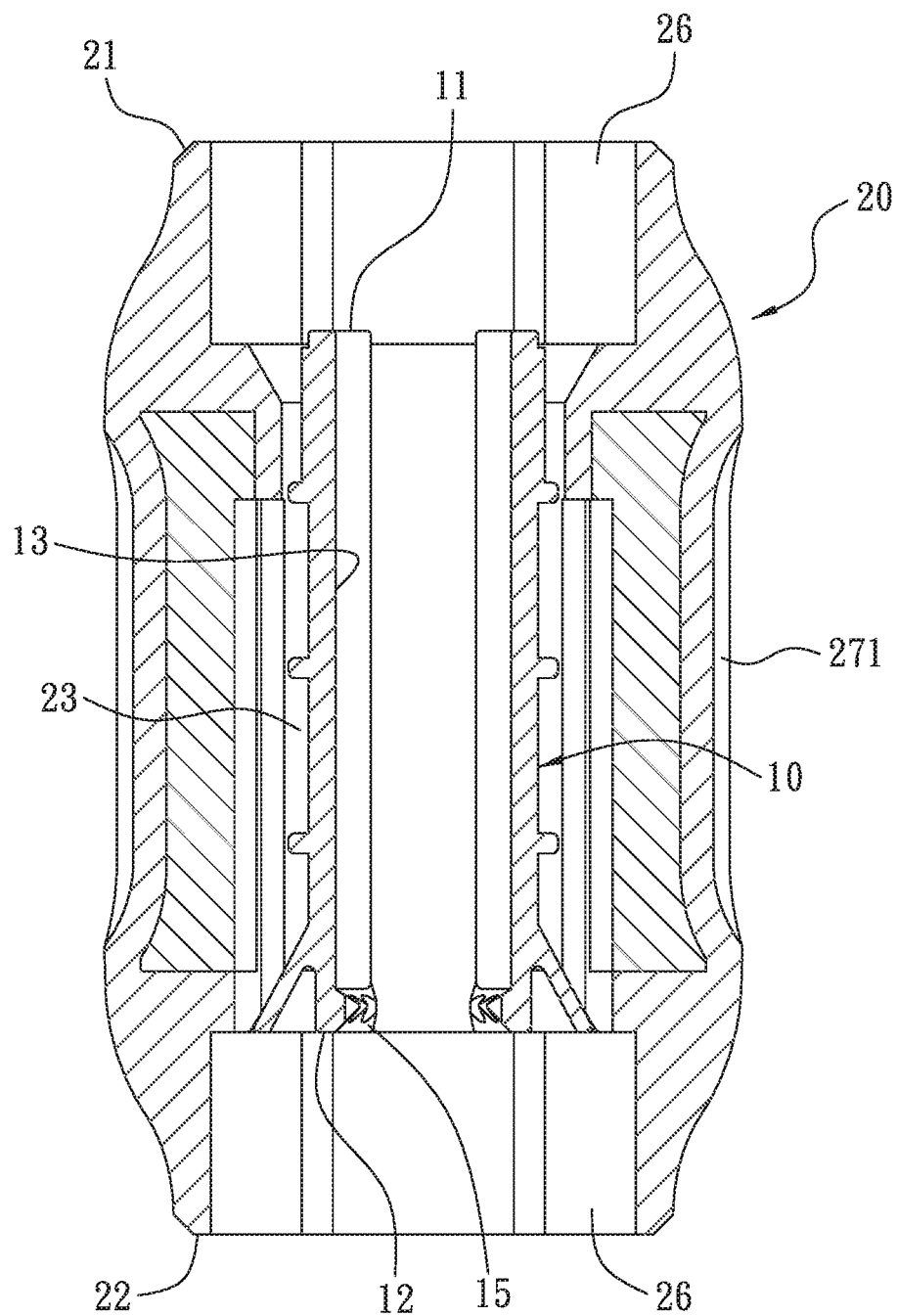
FIG. 21 is a cross sectional view showing the assembly of the weight assembly for the faucet according to the third embodiment of the present invention.

Referring to FIGS. 19-21, a difference of a weight assembly 1 of a third embodiment from that of the second embodiment comprises:

the through orifice 23 of the counterweight 20 having two connection trenches 26 formed on two ends of the through orifice 23 respectively, wherein a diameter of each of the connection trenches 26 is more than the through orifice 23, and the user chooses any one of the two connection trenches 26 to fit with and to rotate the screw nut 5.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A weight assembly being fixed on a hose of a faucet and comprising:
   a tubular retainer including a first segment, a second segment, a fitting orifice defined between the first segment and the second segment, an opening formed on a side of the fitting orifice and communicating with the fitting orifice so that the hose is fitted with the fitting orifice via the opening, an engagement portion arranged on an inner wall of the fitting orifice relative to the second segment so as to engage with the hose and to avoid a movement of the hose in the fitting orifice, and a forced portion formed on an outer wall of the tubular retainer relative to the second segment;
   a counterweight including a third segment, a fourth segment, a through orifice defined between the third segment and the fourth segment so that the counterweight is fitted onto the hose by way of the through orifice, and a press portion formed on an inner wall of the through orifice relative to the fourth segment, such that after the tubular retainer is fitted on the hose, the fourth segment of the counterweight moves toward the first segment of the tubular retainer so that the press portion presses the forced portion of the tubular retainer after the tubular retainer is accommodated into the through orifice, and the forced portion retracts inward to actuate the engagement portion to engage with the hose.

2. The weight assembly as claimed in claim 1, wherein the tubular retainer includes two positioning extensions extending from two sides of the opening respectively, wherein a channel is defined between the two positioning extensions so that the hose s fitted into the fitting orifice via the channel and the opening; the through orifice of the counterweight includes a fixing notch defined on the inner wall of the through orifice and extending from the third segment to the fourth segment so that the two positioning extensions are engaged into the fixing notch from the fourth segment of the counterweight to the third segment of the counterweight, and the tubular retainer is limited to rotate relative to the counterweight.

3. The weight assembly as claimed in claim 2, wherein the two positioning extensions have two first tilted guide faces formed on two tops of the two positioning extensions respectively opposite to the fixing notch, the fixing notch has two second tilted guide faces arranged on two opposite sides of a bottom of the fixing notch individually opposite to the two positioning extensions, and the two first tilted guide faces of the two positioning extensions are respectively guided by the two second tilted guide faces to slide into the fixing notch.

4. The weight assembly as claimed in claim 2, wherein the engagement portion of the tubular retainer has multiple locking teeth.

5. The weight assembly as claimed in claim 4, wherein the engagement portion of the tubular retainer has two meshing sets, and each of the two meshing sets has the multiple locking teeth extending around each meshing set, wherein the two meshing sets circumferentially extend from the two sides of the opening respectively, and the engagement portion has a partition opposite to the opening.

6. The weight assembly as claimed in claim 5, wherein the forced portion of the tubular retainer has an externally conical face formed thereon, and the press portion of the counterweight has an internally conical face for contacting with the externally conical face so as to force the forced portion to flexibly retract inward.

7. The weight assembly as claimed in claim 6, wherein a circular groove is defined among the externally conical face and the two meshing sets so that the forced portion is formed in a trumpet shape to flexibly retract inward, and the forced portion is connected with an outer surface of a bottom of the second segment opposite to each of the two positioning extensions, such that when the forced portion is pressed to actuate the two positioning extensions to move closes to each other, the two positioning extensions drive the two meshing sets to engage with the hose tightly.

8. The weight assembly as claimed in claim 1, wherein the counterweight includes an internal sleeve and an external sleeve fully or partially covering the internal sleeve, wherein the internal sleeve is made of metal, and the external sleeve is made of rubber.

9. The weight assembly as claimed in claim 1, wherein the through orifice of the counterweight has a connection trench opposite to the third segment, a diameter of the connection trench is more than the through orifice so that the connection trench is fitted on a screw nut above the hose before connecting the counterweight with the tubular retainer, and the screw nut is rotated loosely and tightly by rotating the counterweight.

10. The weight assembly as claimed in claim 9, wherein the connection trench has an inner wall formed in a polygon shape so that the connection trench is fitted with a polygonal rim of the screw nut and rotates the screw nut.

11. The weight assembly as claimed in claim 1, wherein the through orifice of the counterweight has two connection trenches formed on two ends of the through orifice respectively, wherein a diameter of each of the two connection trenches is more than the through orifice.

12. The weight assembly as claimed in claim 11, wherein each of the two connection trenches has an inner wall formed in a polygon shape so that each connection trench is fitted with a polygonal rim of the screw nut and rotates the screw nut.

13. The weight assembly as claimed in claim 1, wherein the counterweight includes an anti-slip structure configured to be grasped by a user.

14. The weight assembly as claimed in claim 13, wherein the anti-slip structure has a plurality of peripheral faces surrounding around an outer wall of the anti-slip structure and spaced apart from one another of the plurality of peripheral faces.

* * * * *